(12) United States Patent
Nakajima et al.

(10) Patent No.: US 8,481,135 B2
(45) Date of Patent: Jul. 9, 2013

(54) ENGAGING MEMBER AND PACKING BAG WITH ENGAGING MEMBER

(75) Inventors: Masayoshi Nakajima, Tatebayashi (JP); Naoki Hatakeyama, Hiratsuka (JP)

(73) Assignee: C.I. Kasei Company, Limited (JP)

( * ) Notice: Subject to any disclaimer, the term of this patent is extended or adjusted under 35 U.S.C. 154(b) by 1309 days.

(21) Appl. No.: 11/167,566

(22) Filed: Jun. 27, 2005

(65) Prior Publication Data
US 2006/0292322 A1    Dec. 28, 2006

(51) Int. Cl.
*B65D 33/16* (2006.01)
*A44B 19/00* (2006.01)

(52) U.S. Cl.
USPC ........ 428/35.7; 428/36.9; 24/585.12; 24/399; 24/584.1; 383/63; 383/64; 383/61.2

(58) Field of Classification Search
USPC .............. 428/35.2, 292.1, 297.4, 412, 159, 428/318.6; 383/210, 63; 426/127, 129; 2/82, 2/114; 24/585.12, 399, 584.1
See application file for complete search history.

(56) References Cited

U.S. PATENT DOCUMENTS

| | | | | |
|---|---|---|---|---|
| 4,481,336 A | * | 11/1984 | Fujii et al. | 525/323 |
| 4,778,282 A | * | 10/1988 | Borchardt et al. | 383/63 |
| 6,006,913 A | * | 12/1999 | Ludemann et al. | 206/531 |
| 2005/0031233 A1 | * | 2/2005 | Varanese et al. | 383/211 |
| 2008/0031552 A1 | * | 2/2008 | Tanaka et al. | 383/63 |

FOREIGN PATENT DOCUMENTS

| | | |
|---|---|---|
| JP | 08-192858 | 7/1996 |
| JP | 10-297652 | 11/1998 |
| JP | 10-297653 | 11/1998 |
| JP | 11-349009 | 12/1999 |
| JP | 2005131185 | * 10/2003 |
| JP | 2004-203444 | 7/2004 |
| JP | 2005-008231 | 1/2005 |
| JP | 2005-131185 | 5/2005 |

\* cited by examiner

*Primary Examiner* — Ellen S Raudenbush
(74) *Attorney, Agent, or Firm* — Knobbe Martens Olson & Bear LLP (57) ABSTRACT

This engaging member includes a male part and a female part each of which is capable of engaging with each other, in which each of the male part and the female part has a welded part to a main body of a bag and a part other than the welded part, at least the welded part is formed by a resin composition including (A) a polypropylene type resin having a maximum melting peak temperature measured by a differential calorimeter of not more than 145° C., and a melt flow rate ranging from 0.5 g/10 min. to 20 g/10 min., and (B) a polybutene type resin having a maximum melting peak temperature measured by a differential calorimeter of not more than 130° C., and a melt flow rate ranging from 0.1 g/10 min. to 20 g/10 min.

3 Claims, 6 Drawing Sheets

ENGAGING MEMBER AND PACKING BAG WITH ENGAGING MEMBER

BACKGROUND OF THE INVENTION

1. Field of the Invention

The present invention generally relates to an engaging member and a packing bag with an engaging member, and particularly to an engaging member and a packing bag with an engaging member which can be applied to packaging in the field which requires moisture prevention, oxygen-blocking property, and having a function that it can be sealed again after it is opened, such as foods, medicine, and miscellaneous goods.

2. Description of the Related Art

A bag for packing having an engaging member (zipper bag) consisting of a male part and a female part which enables the bag to be opened and closed freely is used in various fields, such as food, medicine, and miscellaneous goods. As for the process for producing such a packing bag with an engaging member, various processes are proposed. For example, a method of integrally extruding a cylindrical film having a pair of engaging member consisting of a male mold and a female mold through a circular die, a method of extruding and welding an engaging members onto a film, and a method of thermally welding an engaging member which is prepared beforehand onto a base material film as a main body of a packing bag or fixing such an engaging member to the base material film using an adhesive.

However, each of the former two methods has problems in handling and cost, for example, the kind of resin which can be used is restricted, it is difficult to apply the method to a multi-layered film substrate, it is difficult to apply the method to bags having various size, and printing on the bag is difficult, and hence, the method of thermally welding the engaging member prepared beforehand onto a base material film as a main body of a packing bag is used generally.

As the material for preparing the engaging member, polyethylene type resin and polypropylene type resin are widely used, and in the case in which the material of the welded part of the engaging member is a polypropylene type resin, as a base material film of the main body which is thermally welded, laminate films, such as OPP/CPP (oriented polypropylene/non-oriented polypropylene), ONy/CPP (oriented nylon/non-oriented polypropylene), PET/CPP (oriented polyester/non-oriented polypropylene), etc., are used, and among these, OPP/CPP is exemplary as a general-purpose base material film.

In the case of OPP/CPP which is a general-purpose base material film, both the welded layer and non-welded layer of the base material film are made of a polypropylene type resin, the temperature difference between the welded layer and the non-welded layer is small, compared with that of the base material film such as ONy/CPP, PET/CPP, etc., and as a result, if the welding temperature when when welding the welding part of the engaging member with the base material film is high, then it affects on the non-welded layer side, thereby generating external defects on the bag such as shrinking, creases, etc. On the other hand, if the welding temperature when welding the welding part of the engaging member with the base material film is low, then it takes a long time for welding, bag producing speed, that is, the productivity will deteriorate, and in addition, the energy cost will increase.

Accordingly, an engaging member which is capable of being welded with the base material film at a lower temperature and has a basic performance as an engaging member is required from the view-point of improvement of production efficiency, energy-saving, and improvement of external appearance. Under such circumstances, for example, Patent document 1 (Japanese Unexamined Patent Application, First Publication No. H08-192858) discloses a polypropylene type engaging member made of a crystalline propylene-ethylene-butene-1 random terpolymer, and an engaging member formed by a mixture consisting of not less than 60 weight % of a crystalline propylene-ethylene-butene-1 random terpolymer and not more than 40 weight % of an ethylene-butene-1 copolymer and/or low density polyethylene.

However, if an engaging member is formed by a crystalline propylene-ethylene-butene-1 random terpolymer, then sufficient welding ability at a low temperature is not obtained, although the welding ability at a low temperature is improved. On the other hand, if a polyethylene type resin is blended, although the welding ability at a low temperature is inclined to be improved, then no satisfactory performance can be obtained, because the polypropylene type resin and the polyethylene type resin are different in nature to each other, and hence commercial value deteriorates due to external defects caused by problems such as incompatibility therebetween, etc.

Thus, it is an object of the present invention to provide an engaging member having a sufficient welding ability at a low temperature and satisfactory external appearance, and a packing bag with such an engaging member.

SUMMARY OF THE INVENTION

The inventors of the present invention have researched thoroughly in order to resolve the above problem, and as a result they found that an engaging member which is capable of being welded at a low temperature, as well as having excellent mechanical strength, heat-resistance, and external appearance, while maintaining superior engaging strength, can be obtained by using a resin composition consisting of (A) a specific polypropylene type resin, and (B) a specific polybutene type resin, at the welding part of the engaging member, thereby completing the present invention.

That is, the present invention relates to an engaging member including a male part and a female part each of which is capable of engaging with each other, in which each of the male part and the female part has a welded part to a main body of a bag and a part other than the welded part, at least the welded part is formed by a resin composition containing (A) a polypropylene type resin having a maximum melting peak temperature measured by a differential calorimeter of not more than 145° C., and a melt flow rate ranging from 0.5 g/10 min. to 20 g/10 min.
and (B) a polybutene type resin having a maximum melting peak temperature measured by a differential calorimeter of not more than 130° C., and a melt flow rate ranging from 0.1 g/10 min. to 20 g/10 min.

DETAILED DESCRIPTION OF THE INVENTION

One preferred embodiment of the present invention will be explained in detail below, referring to the drawings.

A polypropylene type resin (A) is one which has a maximum melting peak temperature measured by a differential calorimeter of not more than 145° C., and a melt flow rate at 230° C. which ranges from 0.5 g/10 min. to 20 g/10 min., preferably from 1 g/10 min. to 15 g/10 min., and the polypropylene type resin (A) is preferably a homopolymer of propylene, or a copolymer of propylene and another α-olefin, more preferably a copolymer of propylene and another α-olefin. The above copolymer is a copolymer of propylene and one or more kinds of α-olefin (for example, ethylene, butene, hexene, etc.), and may be either a random copolymer, or a block copolymer, and may be a single resin thereof or a composition consisting of two kinds or more thereof. The maximum melting peak temperature of the polypropylene type resin (A) is specified as above, because if the peak temperature exceeds 145° C., then the welding ability at a low temperature deteriorates, although the heat resistance is excellent, and the rigidity of the engaging member increases thus deteriorating the basic function as an engaging member. The melt flow rate is specified as above, because if the melt flow rate is less than 0.5 g/10 min., then the extrusion-molding ability deteriorates, whereas if the melt flow rate exceeds 20 g/10 min., then the shape-holding property deteriorates.

A polybutene type resin (B) is one which has a maximum melting peak temperature measured by a differential calorimeter of not more than 130° C., and a melt flow rate at 190° C. which ranges from 0.1 g/10 min. to 20 g/10 min., preferably from 1 g/10 min. to 15 g/10 min., and the polybutene type resin (B) is a homopolymer of butene-1, or a copolymer of butene-1 and ethylene or a copolymer of butene-1 and propylene. The above copolymer may be either a random copolymer, or a block copolymer, and may be a single resin thereof or a composition consisting of two kinds or more thereof.

The maximum melting peak temperature of the polybutene type resin (B) is specified as above, because if the peak temperature exceeds 130° C. then the welding ability at a low temperature deteriorates. The melt flow rate is specified as above because if the melt flow rate is less than 0.1 g/10 min., then the extrusion-molding ability deteriorates, whereas if the melt flow rate exceeds 20 g/10 min., then the shape-holding ability deteriorates.

In addition, the percentage Content of the resin composition according to the present invention is specified as above, because if the percentage Content of the polybutene type resin (B) is not more than 10 weight %, then satisfactory welding ability at a low temperature is not obtained, whereas if the percentage Content of the polybutene type resin (B) is not less than 60 weight %, then the welding strength deteriorates, as a result, satisfactory welding ability at a low temperature is not obtained.

Moreover, in the engaging member of the present invention, it is necessary that the above composition containing the polypropylene type resin (A) and the polybutene type resin (B) be disposed to the welding part between the male side and the female side, and hence the part other than the welding part may be either the above composition or another composition. And further, the part other than the welding part may be either a single layer or multiple layers. Each of the male part and the female part is not particularly limited in shape and number, and they may be an arbitrary shape as long as the function is attained whereby the engaging member can be closed after it is opened.

Moreover, if necessary, well-known additives, such as a stabilizing agent, an antioxidant, a lubricant, an antistatic agent, a coloring agent, etc., can be used within a range that does not deviate from the spirit of the present invention.

Figure 1:
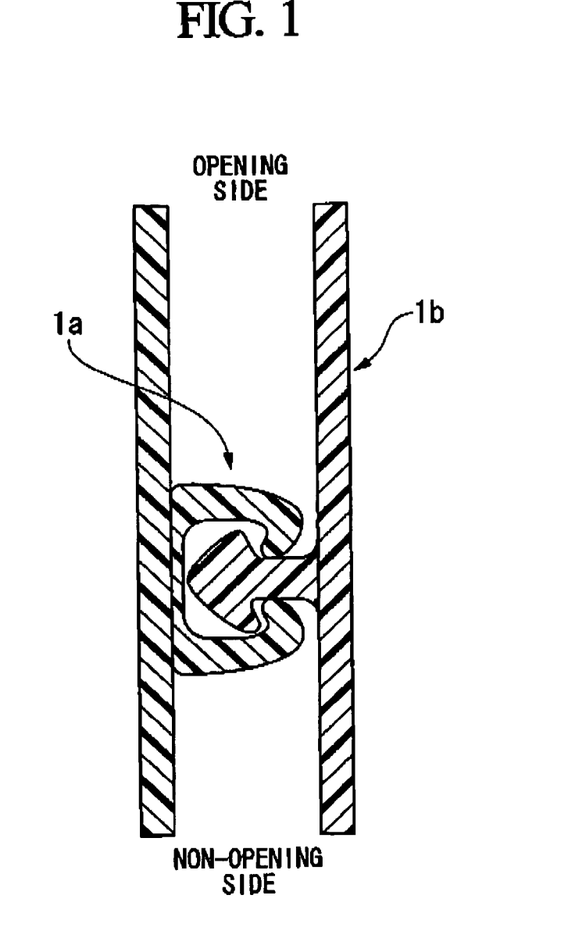
FIG. 1 is a schematic view of an engaging member according to an embodiment of the present invention.

FIG. 1 is a schematic view of an engaging member according to the present invention in which a welding part 1b and a part other than the welding part 1a are formed by the same resin composition. As shown in FIG. 1, in the engaging member of the present invention, the welding part 1b and the part other than the welding part 1a are made of the same resin composition. In this case, the welding part 1b and the part other than the welding part 1a can be formed as one body, alternatively, the part other than the welding part 1a may be adhered to the welding part 1b subsequently.

Figure 2:
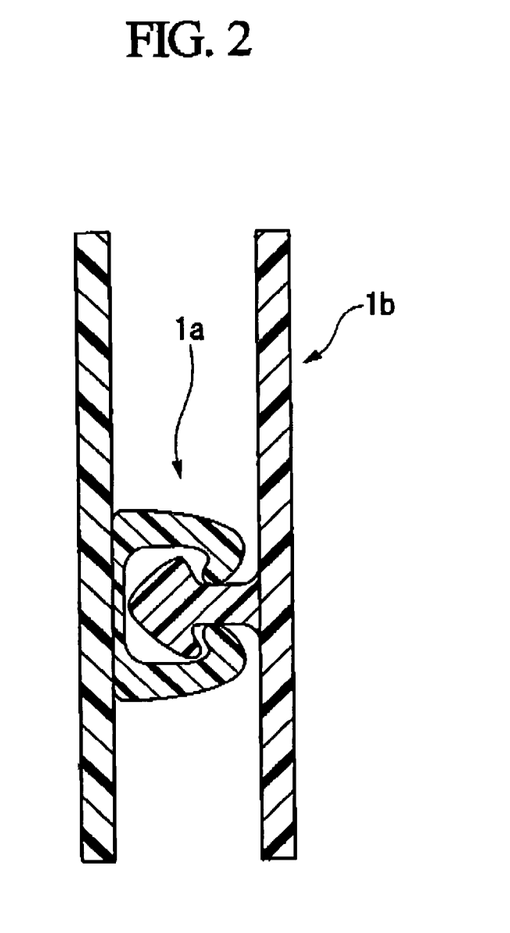
FIG. 2 is a schematic view of an example of the engaging member according to the present invention.

FIG. 2 is a schematic view of an example of the engaging member according to the present invention, in which the part other than the welding part 1a a is made of a resin composition different from the resin composition of which the welding part 1b is formed.

As shown in FIG. 2, in this engaging member, the part other than the welding part 1a is made of a resin composition different from the resin composition of which the welding part 1b is formed.

Figure 3:
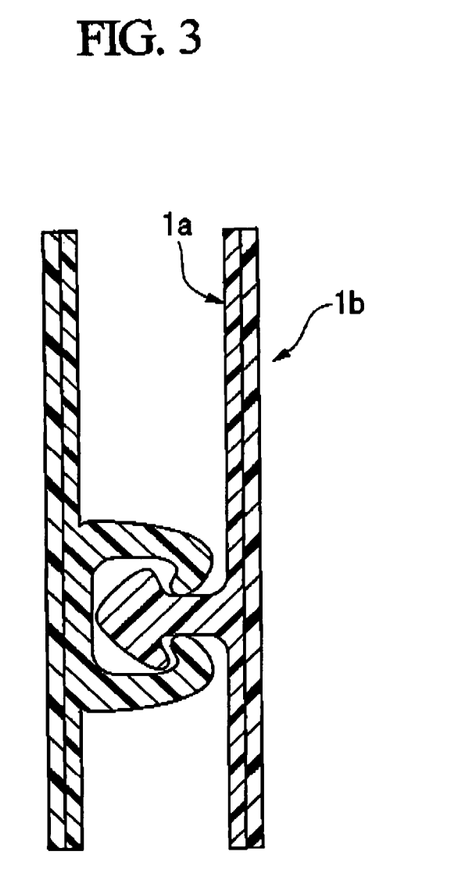
FIG. 3 is a schematic view of another example of the engaging member according to the present invention.

FIG. 3 is a schematic view of other examples of the engaging member according to the present invention. As shown in FIG. 3, in this engaging member, the part other than the welding part 1a is made of a resin composition different from the resin composition of which the welding part 1b is formed.

Figure 4:
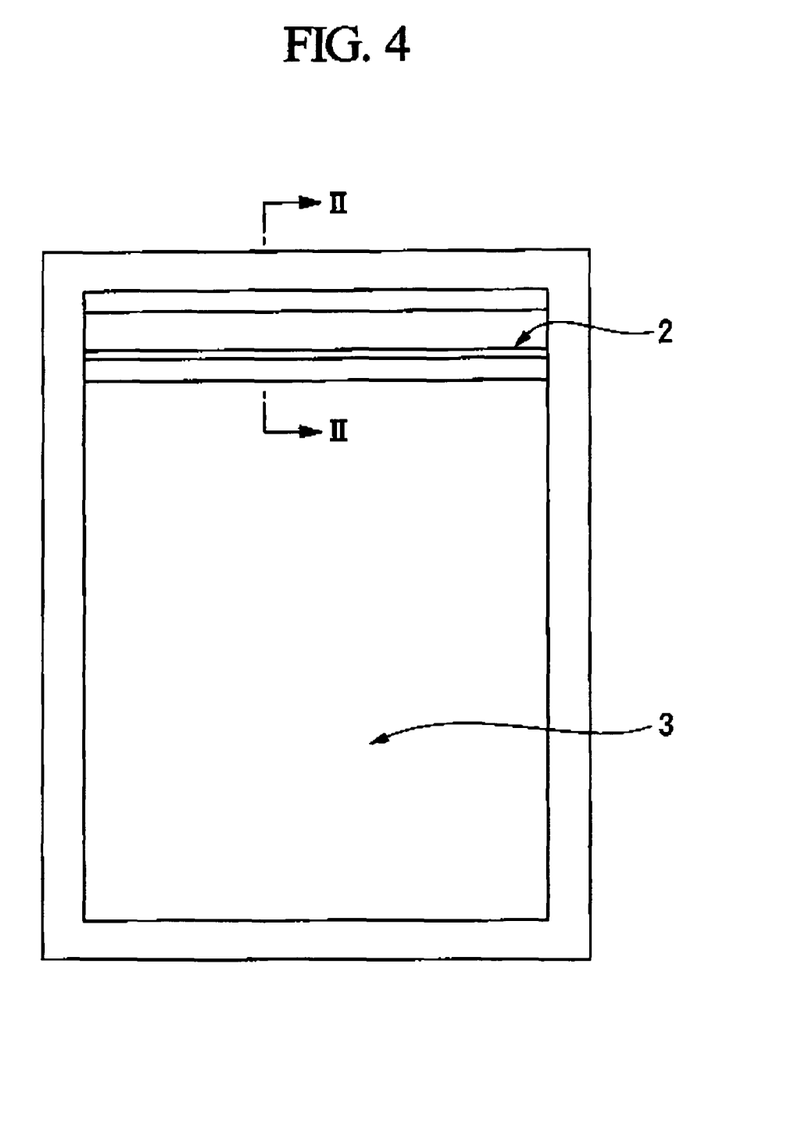
FIG. 4 is a front view of the bag for packing having a engaging member according to the present invention.

FIG. 4 is a front view of a bag for packing having an engaging member according to the present invention.

Figure 5:
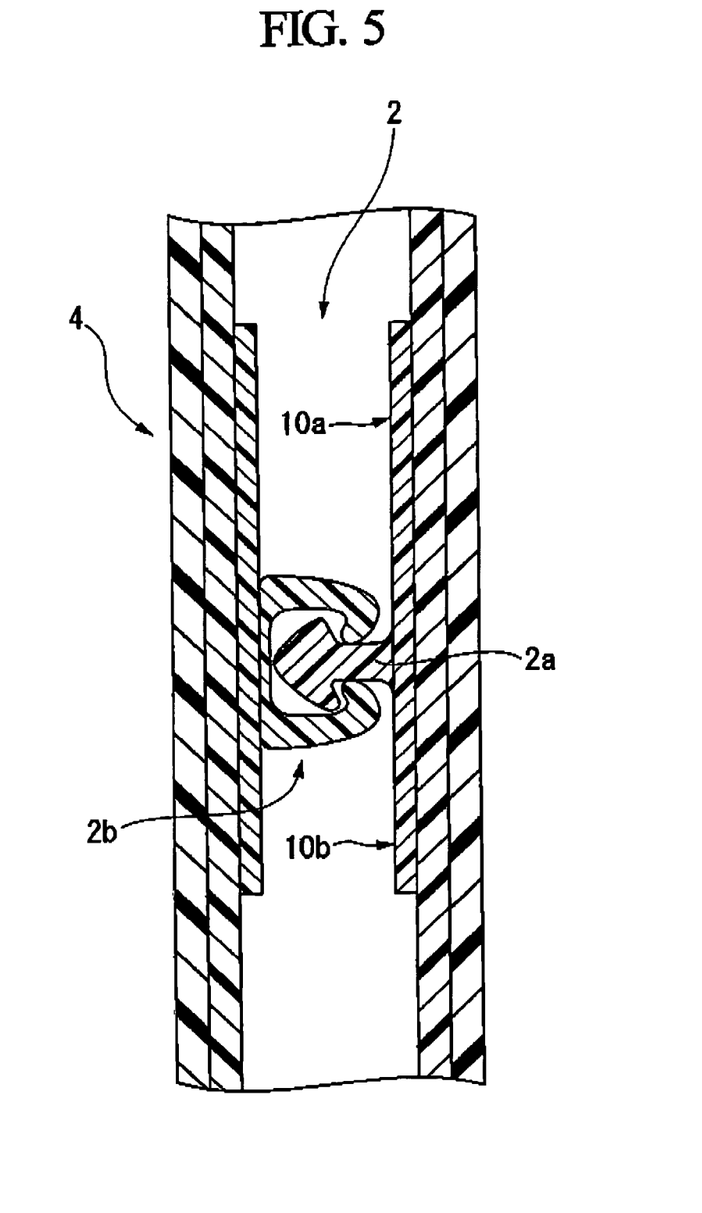
FIG. 5 is a cross sectional view cut along the II-II line in FIG. 4.

FIG. 5 is a cross sectional view cut along the II-II line in FIG. 4. As shown in FIG. 5, the length of a welding part (flange) 10a at an opening side is larger than the length of a welding part (flange) 10b at a non-opening side. In this way, it is preferable that the length of the welding part (flange) 10a at the opening side be different from the length of the welding part (flange) 10b at the non-opening side. The mechanical strength of the welding part (flange) 10a can be increased by differentiating the length as such. Specifically, the length of the welding part (flange) 10b is preferably shorter than that of the welding part (flange) 10a, preferably less than 50% of the entire tape width of the engaging member, and preferably less than 10 mm. The length of the flange of the engaging member is specified as above, because although an engaging member having a small entire tape width, for example an engaging member having an entire width of approximately 10 mm, is affected by substantially no influence, an engaging member having a large entire width, for example one having an entire width of not less than 15 mm, in particular one having an entire width of more than 20 mm, if the length of the flange (10a) at the opening side of the bag is substantially identical to the length of the flange (10b) at the content side of the bag, then the flange of the engaging member is likely to be hooked on a bending-assisting plate which is used in bending the base material film into a bag and sealing it or a sailor blouse-like portion of filling and packing apparatus, thereby being wound or making the engaging member be disengaged.

Moreover, the length of the flange (10b) preferably ranges from 0 to less than 10 mm, because as for an engaging member having the flange (10b) which is placed on the content side of the bag, having a length of more than 10 mm, then the flange of the engaging member is likely to be hooked, being wound or the engaging member may be disengaged, even if the length of the flange (10b) which is positioned at the content side of the bag is shorter than the length of the other flange (10a) which is positioned at the opening side of the bag, and is preferably less than 50% of the entire tape width of the engaging member.

Figure 6:
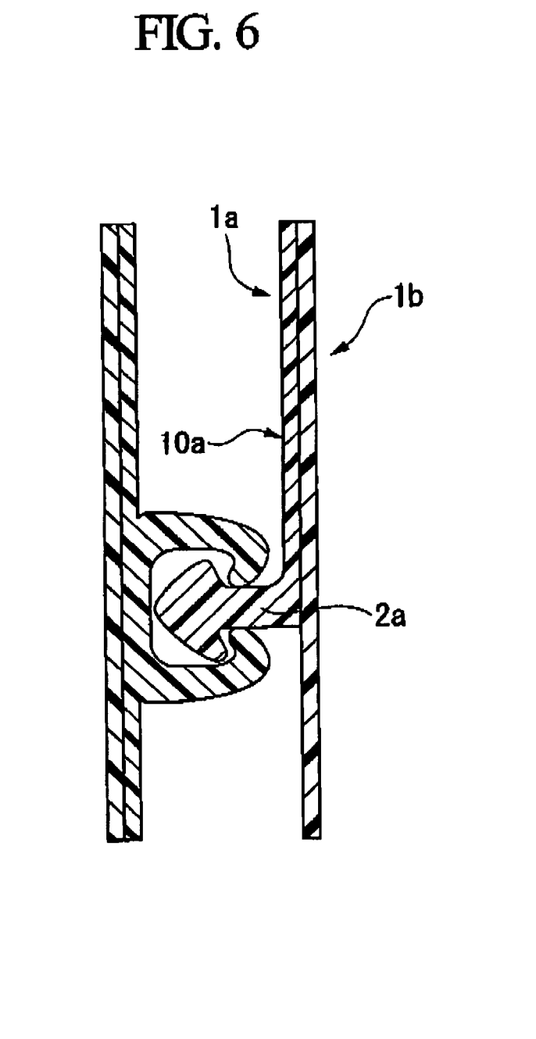
FIG. 6 is a schematic view showing a cross sectional view of a modification of the engaging member according to the present invention.

FIG. 6 is a schematic view showing a section of a modification of the engaging member of the present invention. As shown in FIG. 6, it is also possible to form a shape such that an engaging part 2a is extended perpendicularly against the longitudinal direction of the welding part 10a at one end of the welding part 10a. This can enable the engaging member to be more easily welded to the bag 1b by forming the engaging member into a shape having an L-shaped cross section.

EXAMPLE

The present invention will be explained in more detail, referring to Examples and Comparative Examples hereinafter, however, the scope of the present invention is not at all limited to the following Examples.

Maximum Melting Peak Temperature

The maximum melting peak temperature was obtained in accordance with JIS K 7121 at a heating rate of 10° C./min., using a differential scanning calorimeter Model DSC-7 made by Perkin Elmer Co., Ltd.

Melt Flow Rate

As for polypropylene type resin, the melt flow rate was measured at 230° C., on the other hand, as for a polybutene type resin, the melt flow rate was measured at 190° C., with a 2.16 kg load using a Melt Indexer made by TOYOSEIKI SEISAKUSYO Co., Ltd., in accordance with JIS K7210.

Heat Welding Method

Using a thermal inclining testing apparatus made by TOYOSEIKI SEISAKYSHO Co., Ltd., heat welding of the welding layer of the base material and the welding part of the engaging member was performed to obtain a test piece. As the base material, a double-layer laminate film consisting of OPP/CPP (20μ/30μ) was used. As the welding part of the engaging member, the flat part of the non-opening side on the male side was cut into a piece having a width of 5 mm and a length in the longitudinal direction of 30 cm was used. In addition, as the condition for welding of the thermal inclining testing apparatus, the pressure during welding was set to 1.0 kgf/cm², and the time for welding was set to 1.0 sec.

Measurement of Heat Welding Temperature

The welding strength between the base material film of the test piece which was heat welded in the above and the welding part of the engaging member was measured using a STROGRAPH drawing testing apparatus made by TOYOSEIKI SEISAKUSYO Co., Ltd. As for the welding temperature, the temperature when the welding strength between the base material film and the welding part of the engaging member reached not less than 1 kg was determined as the welding temperature. In addition, the drawing rate in measuring the welding strength was 200 mim/min. and the above heat welding and measurement of the welding temperature were performed in a thermostatic chamber held at a temperature of 23° C. and a humidity 50%.

Example 1

As the material for the welding part and the part other than the welding part of the engaging member, a resin composition consisting of 80 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and melt flow rate of 3.6 g/10 min., and 20 weight % of a butene-1/propylene copolymer (TAFMER BL2281 (brand name) produced by Mitsui Chemical Co., Ltd.) having a maximum melting peak temperature measured by a differential calorimeter of 112° C., and melt flow rate of 2.0 g/10 min. was prepared.

This resin composition was subjected to a melting kneading processing at 210° C. using an extruding apparatus having an aperture size of 40 mm, and L/D of 25, and then introduced into a profile die having the male mold and the female mold of the engaging member, where the resin composition was subjected to an extrusion molding, and thereafter the resin composition was introduced into a cooling water bath to be cooled and solidified, and then was wound by a winding apparatus to obtain an engaging member. The welding temperature is shown in Table 1.

Example 2

An engaging member was obtained by the same method as in Example 1, with the exception of using a resin composition consisting of 80 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and melt flow rate of 3.6 g/10 min., and 20 weight % of a butene-1 homopolymer TAFMER BL4000 (brand name) produced by Mitsui Chemical Co., Ltd.) having a maximum melting peak temperature measured by a differential calorimeter of 115° C., and melt flow rate of 1.8 g/10 min., as the material for the welding part and the part other than the welding part of the engaging member. The welding temperature is shown in Table 1.

Example 3

As the material for the welding part of the engaging member, a resin composition consisting of 60 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and Melt flow rate of 3.6 g/10 min., and 40 weight % of a butene-1/propylene copolymer (TAFMER BL2281 (brand name) produced by Mitsui Chemical Co., Ltd.) having the maximum melting peak temperature by a differential calorimeter of 112° C., and Melt flow rate of 2.0 g/10 min. was prepared. And as the material for the part other than the welding part of the engaging member, a resin composition consisting of 100 weight % of an ethylene/propylene copolymer (Mitsui-Sumitomo Polypro FS3611 (brand name) produced by Mitsui-Sumitomo Polyolefin Co., Ltd.) having the maximum melting peak temperature by a differential calorimeter of 132° C., and Melt flow rate of 3.6 g/10 min. was prepared.

Each of these resin compositions was subjected to a melting kneading processing at 210° C. using an extruding apparatus having an aperture size of 30 mm, and L/D of 25 for the welding part, and using an extruding apparatus having an aperture size of 40 mm, and L/D of 25 for the part other than the welding part, and then introduced into a composite profile die having the male mold and the female mold of the engaging member, where each of the resin compositions was subjected to co-extrusion molding, and thereafter each of the resin compositions was introduced into a cooling water bath to be cooled and solidified, and then was wound by a winding apparatus to obtain an engaging member. The welding temperature is shown in Table 1.

Comparative Example 1

An engaging member was obtained by the same method as in Example 1, with the exception of using a resin composition consisting of 100 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and Melt flow rate of 3.6 g/10 min., as the material for the welding part and the part other than the welding part of the engaging member. The welding temperature is shown in Table 1.

Comparative Example 2

An engaging member was obtained by the same method as in Example 1, with the exception of using a resin composition consisting of 100 weight % of an ethylene/propylene/butene-1 random terpolymer (Mitsui-Sumitomo Polypro FL6737(brand name) produced by Mitsui-Sumitomo Polyolefin Co., Ltd.) having a maximum melting peak temperature measured by a differential calorimeter of 130° C., and Melt flow rate of 6.0 g/10 min., as the material for the welding part and the part other than the welding part of the engaging member. The welding temperature is shown in Table 1.

Comparative Example 3

An engaging member was obtained by the same method as in Example 1, with the exception of using a resin composition consisting of 80 weight % of an ethylene/propylene/butene-1 random terpolymer (Mitsui-Sumitomo Polypro FL6737 (brand name) produced by Mitsui-Sumitomo Polyolefin Co., Ltd.) having a maximum melting peak temperature measured by a differential calorimeter of 130° C., and Melt flow rate of 6.0 g/10 min., and 20 weight % of a low-density polyethylene (SUMIKASEN F412-1 (brand name) produced by Mitsui-Sumitomo Polyolefin Co., Ltd.) having a maximum melting peak temperature by a differential calorimeter of 110° C., and Melt flow rate of 5.0 g/10 min., as the material for the welding part and the part other than the welding part of the engaging member. The welding temperature is shown in Table 1.

Comparative Example 4

An engaging member was obtained by the same method as in Example 1, with the exception of using a resin composition consisting of 100 weight % of a propylene homopolymer (Mitsui-Sumitomo Polypro FS2011 (brand name) produced by Mitsui-Sumitomo Polyolefin Co., Ltd.) having a maximum melting peak temperature measured by a differential calorimeter of 158° C., and Melt flow rate of 2.6 g/10 min., as the material for the welding part and the part other than the welding part of the engaging member. The welding temperature is shown in Table 1.

Comparative Example 5

An engaging member was obtained by the same method as in Example 1, with the exception of using a resin composition consisting of 80 weight % of a propylene homopolymer (Mitsui-Sumitomo Polypro FS2011DG2 (brand name) produced by Mitsui-Sumitomo Polyolefin Co., Ltd.) having a maximum melting peak temperature measured by a differential calorimeter of 158° C., and Melt flow rate of 2.6 g/10 min., and 20 weight % of a butene/propylene copolymer resin (TAFMER BL2281 (brand name) produced by Mitsui Chemical Co., Ltd.) having a maximum melting peak temperature measured by a differential calorimeter of 112° C., and Melt flow rate of 2.0 g/10 min., as the material for the welding part and the part other than the welding part of the engaging member. The welding temperature is shown in Table 1.

Comparative Example 6

An engaging member was obtained by the same method as in Example 1, with the exception of using a resin composition consisting of 95 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and Melt flow rate of 3.6 g/10 min., and 5 weight % of a butene/propylene copolymner resin (TAFMER BL2281 (brand name) produced by Mitsui Chemical Co., Ltd.) having a maximum melting peak temperature measured by a differential calorimeter of 112° C., and Melt flow rate of 2.0 g/10 min., as the material for the welding part and the part other than the welding part of the engaging member. The welding temperature is shown in Table 1.

Comparative Example 7

An engaging member was obtained by the same method as in Example 1, with the exception of using a resin composition consisting of 20 weight % of an ethylene/propylene copolymer (Mitsui-Sumitomo Polypro FS3611 (brand name) produced by Mitsui-Sumitomo Polyolefin Co., Ltd.) having a maximum melting peak temperature measured by a differential calorimeter of 132° C., and Melt flow rate of 3.6 g/10 min., and 80 weight % of a butene/propylene copolymer resin (TAFMER BL2281 (brand name) produced by Mitsui Chemical Co., Ltd.) having a maximum melting peak temperature measured by a differential calorimeter of 112° C., and Melt flow rate of 2.0 g/10 min., as the material for the welding part and the part other than the welding part of the engaging member. The welding temperature is shown in Table 1.

TABLE 1

| | Weight % | | | | | | |
|---|---|---|---|---|---|---|---|
| | Polypropylene type resin | | | Polybutene type resin | | | |
| | Ethylene | | | | | | |
| Melt flow rate | Ethylene propylene copolymer 3.6 g/10 minutes | propylene butene1 copolymer 6.0 g/10 minutes | Propylene homopolymer 2.6 g/10 minutes | Butene-1 propylene copolymer 2.0 g/10 minutes | Butene-1 homopolymer 1.8 g/10 minutes | Polyethylene type resin 5.0 g/10 minutes | Welding temperature (degree C.) |
| Example 1 | 80 | — | — | 20 | — | — | 134 |
| Example 2 | 80 | — | — | — | 20 | — | 134 |
| Example 3* | 60 | — | — | 40 | — | — | 132 |
| Comparative example 1 | 100 | — | — | — | — | — | 140 |
| Comparative example 2 | — | 100 | — | — | — | — | 139 |
| Comparative example 3 | — | 80 | — | — | — | 20 | Welding is impossible |
| Comparative example 4 | — | — | 100 | — | — | — | 168 |
| Comparative example 5 | — | — | 80 | 20 | — | — | 142 |
| Comparative example 6 | 95 | — | — | 5 | — | — | 139 |
| Comparative example 7 | 20 | — | — | 80 | — | — | 139 |

*Resin composition of the welding part of an engaging member

As mentioned above, although preferred embodiments of the present invention are explained, the present invention is not limited to these embodiments. As long as it does not deviate from the spirit of the present invention, addition, modification, substitution and other changes to the constitution may be performed. The present invention is not limited by the explanation above and is limited only by the scope of the attached claims.

The engaging member of the present invention and bag for packing having an engaging member are excellent when welding ability at a low temperature, which is an especially important evaluation criteria for an engaging member, and have good re-opening and closing function, engaging strength, and heat resistance.

What is claimed is:

1. An engaging member comprising a male part and a female part each of which is capable of engaging with each other, wherein each of the male part and the female part has a welded part to a main body of a bag and a part other than the welded part, at least the welded part is formed by a resin composition comprising (A) a polypropylene type resin having the maximum melting peak temperature by a differential calorimeter of not more than 145° C., and a melt flow rate ranging from 0.5 g/10 min. to 20 g/10 min., and (B) a butene-1/propylene copolymer having a maximum melting peak temperature measured by a differential calorimeter of not more than 130° C., and a melt flow rate ranging from 0.1 g/10 min. to 20 g/10 min. and wherein the resin composition contains from 60 to 80 weight % of the polypropylene type resin (A) and 20 to 40 weight % of the butene-1/propylene copolymer (B).

2. A bag for packing having the engaging member as set forth in claim 1, wherein the engaging member is welded to a main body of the bag by way of the welded part thereof.

3. The engaging member of claim 1, wherein the butene-1/propylene copolymer is a random copolymer.

* * * * *